6301X
J. Beckwith,
Boring Timber.
*Patented Dec. 21, 1830.*
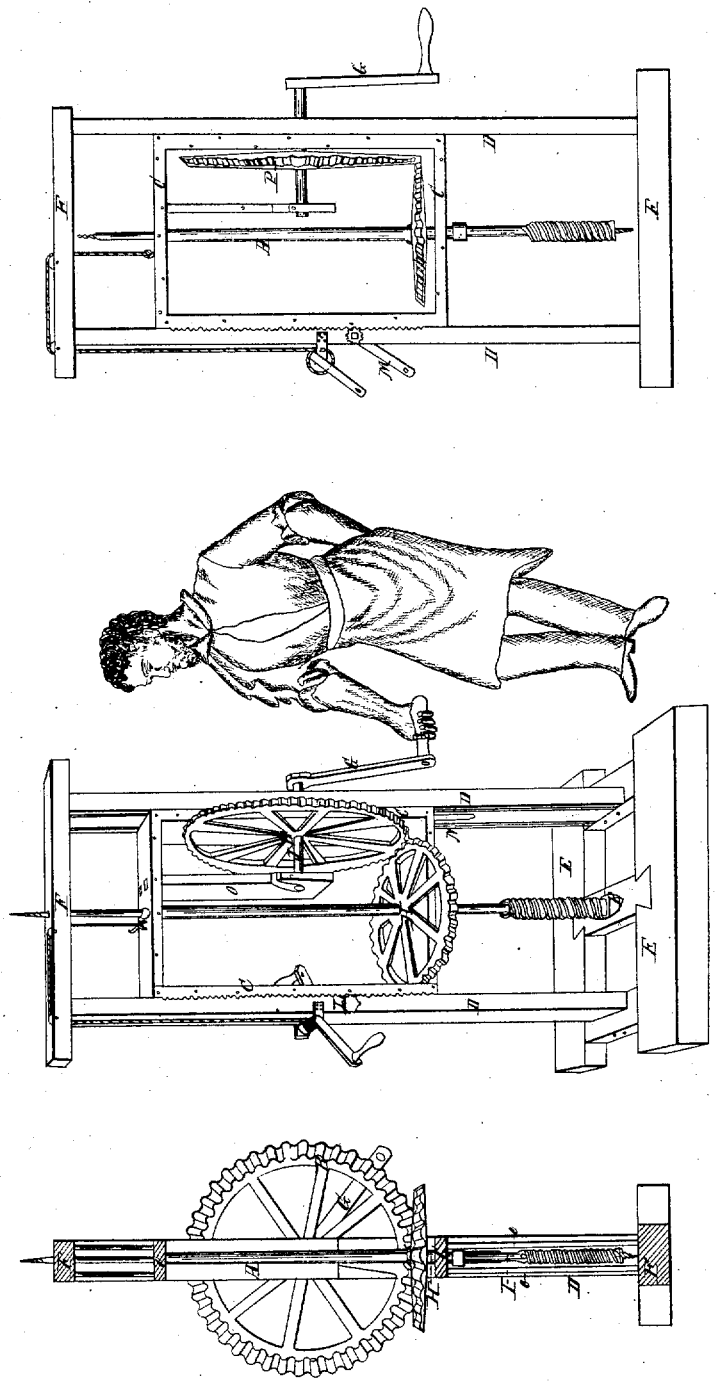
AM. PHOTO-LITHO. CO. N.Y. (OSBORNE'S PROCESS)

X6301 Dec. 21. 1830 407

Jedediah Beckwith
Letters Patent

The Schedule referred to in these Letters Patent and making part of the same containing a description in the words of the said Jedediah Beckwith himself of his improvement for boring timber.

---

To all to whom these Presents shall come

Be it known that I Jedediah Beckwith of the town of Saratoga in the County of Saratoga and State of New York have invented a new and useful improvement for boring timber and that the following is a full and exact description of the construction and operation of the said machine as invented by me for working the Auger A as exhibited on the accompanying draft represents a a shaft into which are inserted the auger pods B. secured to and moving with the sliding frame C. D. represents the main frame consisting of two uprights capped and mortised in the bed E. and braced, with grooves for C. to slide in. F. represents a crank and pinion wheel resting upon two upright posts marked G. mortised into the bed of the frame and braced at N. to the main post which operating upon the rack H. attached to the sliding frame serve to raise or lower the auger, the same office may be performed by the line I attached to the top of the sliding frame and passing over sheives wrought upon by a weight or wheel at K. L. represents a bevel gear and crank attached to the sliding frame the shaft of which plays in the slot M. cut out of one of the main uprights and acts upon the wheel P. attached to the shaft A and turns the auger. O. holes in the bed piece and cap through which the augers pass into timbers above or beneath the machine. The machine is intended to be worked by hand or other power applied to the bevel gear shaft and to be used in boring all kinds of timber and in any position. It will be useful in ship bridge & dock building. The dimensions of a machine capable of boring 25 inches deep are as follows. Bed frame E. 3½ feet long 4 inches board 3 by 5 inch timber, Uprights D. 4.4 long, cap E. 2½ long timber 2 by 4 inch stuff. Sliding frame C. 2.3. long 20 inches

[illegible]

[illegible]

X6361 vides Horizontal wheel P 15 inches diameter, Perpendicular wheel I, 24 inches diameter, shaft 4 ft 2 in long, crank 15 in. Upright shaft A, 2 feet 8 from extremity of crank head into which — auger is inserted size 1½ inches.

Witnesses
M. H. Nash McClellan
R. M. Livingston

Jacob Bichwitz (490